July 9, 1968  F. JORDAN  3,391,953

SHAFT FASTENING ARRANGEMENT

Filed Oct. 22, 1965

INVENTOR:
FRIEDRICH JORDAN

# United States Patent Office 3,391,953
Patented July 9, 1968

3,391,953
SHAFT FASTENING ARRANGEMENT
Friedrich Jordan, Wethmar, near Lunen, Westphalia, Germany, assignor to Gewerkschaft Eisenhutte Westfalia, Wethmar, near Lunen, Westphalia, Germany, a corporation
Filed Oct. 22, 1965, Ser. No. 502,677
Claims priority, application Germany, Nov. 12, 1964, G 42,001
4 Claims. (Cl. 287—52.02)

ABSTRACT OF THE DISCLOSURE

An arrangement for fastening a shaft to a forked support member, in which the shaft is provided with a transversely extending groove and is borne between the fork arms of the support member against a bearing surface thereat, and the shaft is locked both against rotary and axial movement relative to the support member by a pin which extends through bushings provided in the fork arms, these bushings being positioned with respect to the shaft groove to hold the pin in elastically preloaded bearing engagement therewith.

---

This invention relates in general to methods and arrangements for fastening shafts to support members, and more particularly to an arrangement for fastening a shaft to a support member whereby both rotary and axial relative movement between the shaft and support member are effectively prevented.

The preferred embodiment of the invention contemplates a support member having a pair of fork arms and a cylindrically curved bearing surface located between these fork arms to receive and bear against a shaft. The shaft is provided with an open groove extending transversely with respect to the shaft axis and offset therefrom. A pin extending through a pair of bushings provided one in each fork arm is received by the groove in bearing engagement therewith to lock the shaft against rotary movement and also against axial movement relative to the support member. The bushings are positioned with respect to the effective depth of the shaft groove so that the pin is held in elastically preloaded bearing engagement therewith, thus providing an arrangement which can be conveniently assembled simply by driving the pin through the bushings.

Essentially, the fastening arrangement of the invention comprises a combination including a support member having a bearing surface portion and at least one internal bushing extending transversely with respect to the bearing surface, a shaft disposed in bearing contact with the support member bearing surface and having a transverse groove oriented in substantially parallel relation to the axis of the bushing, and a pin member extending through the bushing and disposed in bearing engagement with the shaft groove to secure the shaft to the support member. This pin member is actually seated into the groove which is open at the exterior surface of the shaft and prevents axial sliding of the shaft along the support member bearing surface, whereas by reason of the transverse pin and groove arrangement, rotation of the shaft about its longitudinal axis is substantially precluded.

According to a preferred embodiment of the invention, a bifurcated support member is used to accommodate the provision of a coaxially aligned pair of internal bushings therein for laterally constraining both opposite end portions of the pin, although theoretically, a single guide bushing would suffice for holding one end of the pin which would then be cantilevered into bearing contact with the shaft groove.

One of the advantages of the invention lies in the fact that by positioning the supporting member bushings at an appropriate predetermined distance with respect to the shaft groove, the pin can be held in a preloaded bearing engagement therewith, thus being self securing, without the need for any auxiliary fastening means such as screws, wedges, etc., and yet capable of simple and rapid installation and removal by light hammer blows.

This predetermined distance is established by the physical dimensions of the pin and shaft groove, and by the elastic limit of the pin. According to the invention, a pin to groove spatial arrangement is provided wherein the portions of the pin passing through the support member bushings are held thereby below the effective depth of the shaft groove so as to effect a transverse bending of the pin within its elastic limit. The portion of the pin that is in bearing engagement with the groove, of course, is held at the effective depth of the groove and not below because of the substantial rigidity of the shaft. Hence, due to the bending of the pin, which is actually relatively slight for the purpose of permitting easy installation and removal, the pin exerts an elastically preloaded bearing force against the shaft groove.

While the invention is generally applicable for fastening shafts to support members, the shaft fastening arrangement of the instant invention is particularly useful in fastening pulley shafts to the guide arms of belt conveyors used in long wall mining operations.

Within such field of application, it is known in the prior art to use a belt conveyor guide arm having a bushing hole in combination with a pulley shaft having a protruding bead or the like, this constituting a means for preventing longitudinal shifting of the shaft in the bushing hole in one axial direction, and in both axial directions when a nut is screwed onto the portion of the pulley shaft extending from the opposite end of the bushing. In such an arrangement, rotation of the pulley shaft about its longitudinal axis is prevented by wedge fastenings or the like.

It is also known in the prior art to provide on the circumference of a pulley shaft locally flattened or tapered surfaces which match with corresponding contact surfaces on the guide arm to prevent the rotation of the shaft relative thereto. Sometimes wedge fastenings are used for this purpose, and must be secured by screws or the like because of the high stress to which they are subject.

While of course threaded fastenings between the pulley shaft and the guide arm could be used to fasten the pulley shaft thereto in such a manner that both rotary and axial relative movement between the shaft and guide arm are precluded, threaded fastenings are generally undesirable for use on conveyors operating in mining areas because of the abrasive environment encountered which will rapidly wear out any threaded fastenings which are frequently taken apart and made up.

It is the purpose of the invention, therefore, to provide a means of fastening the conveyor guide arm and pulley together, exclusive of screw or wedge fastenings, which is positive and reliable in operation and simple and inexpensive to manufacture.

According to a preferred embodiment of the invention, this fastening problem is solved by using a bifurcated guide arm which straddles the pulley shaft forkwise and functions as a support member therefor. The bifurcated portion of the guide arm which straddles the pulley shaft defines a partially cylindrical bearing surface which engages the pulley shaft. A pair of fork arms extending from the bifurcated portion are provided with a pair of coaxially aligned bushing holes extending one through each fork arm for the purpose of receiving a draw pin, said bushings being aligned with a transverse groove provided in the pulley shaft such that the diameter of the pulley shaft minus the maximum effective groove depth is slightly greater than the dimension, measured longitudinally along the fork arms of the guide arm member, from the pulley shaft contact point to the bushings.

By reason of this design, the invention provides a positive and secure fastening of the pulley shaft to the guide arm which can be effected merely by the driving in of a draw pin which undergoes a slight bending within its elastic limit and provides an elastically preloaded bearing grip against the pulley shaft which prevents loosening of the fastening even under conditions of extreme stress.

It is therefore, an object of the invention to provide an arrangement for fastening a shaft to a support member that prevents both rotary and axial relative movement therebetween.

Another object of the invention is to provide a fastening arrangement as aforesaid wherein the shaft is positively locked against axial and rotary movement relative to the support arm by means of a single element which is secured in place by elastic forces.

A further object of the invention is to provide a fastening arrangement as aforesaid which can be simply assembled and disassambled without the need for any special tools.

Still another and further object of the invention is to provide a fastening arrangement as aforesaid which is suitable for use in mining environments to secure belt pulley shafts to the guide arms of belt conveyors.

Other and further objects and advantages of the invention will become apparent from the following detailed description and accompanying drawing in which.

Figure 1:
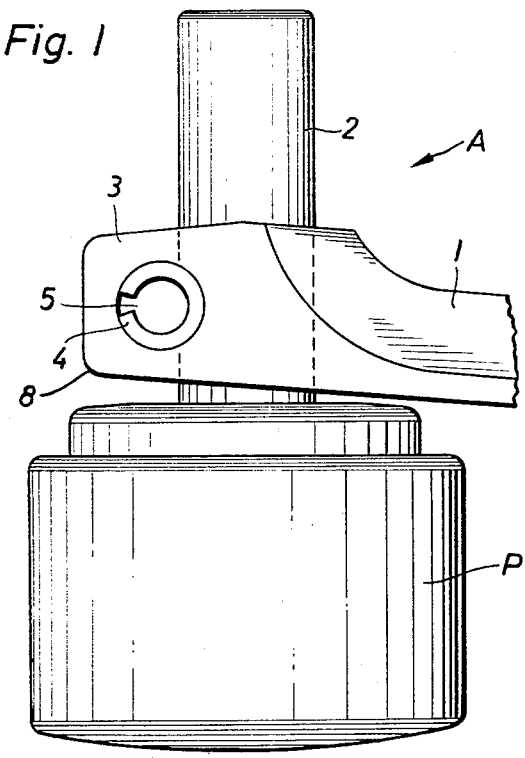
FIG. 1 is a plan view of a shaft fastening arrangement according to a preferred embodiment of the invention.
Figure 2:
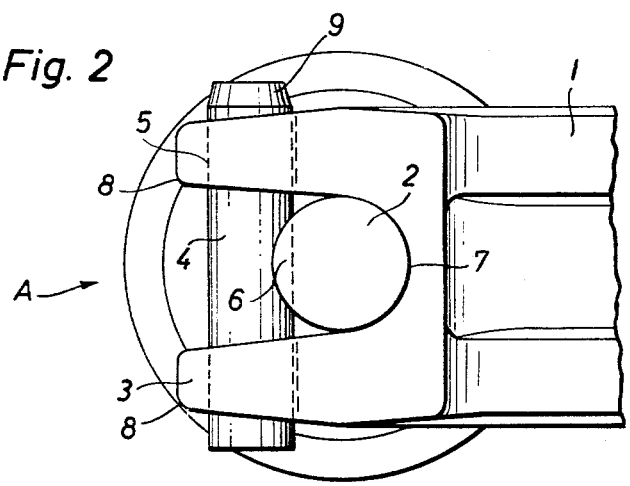
FIG. 2 is a shaft end elevation view of the fastening arrangement of FIG. 1.

Referring now to FIGS. 1 and 2, the fastening arrangement of the invention uses a guide arm 1 as the support for a pulley shaft 2 and an associated pulley P rotatably mounted thereto.

The guide arm 1 has a bifurcated portion 3 defining a partially cylindrical bearing surface 7 and has a pair of fork arms 8 extending from said bifurcated portion 3. To permit the shaft 2 to be easily slipped between the straddling fork arms 8, the cylindrical bearing surface 7 extends for less than 180°, and is preferably equal in radius to the shaft 2 so as to provide maximum contact therewith.

The shaft 2 is provided with an open groove 6 extending transversely with respect to the longitudinal axis of the shaft 2 for bearing contact engagement with a draw pin 4 retained by a pair of internal bushings 5 extending one through each fork arm 8.

To provide a shake-proof type of fastening arrangement A, the bushings 5, which are preferably coaxially aligned with each other, are positioned to hold the portions of the pin 4 passing through them below the effective depth of the groove 6, with the portion of the pin 4 in bearing contact with said groove 6 being substantially at the effective depth of the groove 6 at the extreme contact points therewith and slightly above the effective depth of the groove at the center thereof. This provides a slight transverse bending of the pin 4 within its elastic limit that results in an elastically preloaded bearing engagement contact with the groove 6.

For the specific preferred embodiment shown, using a cylindrical pin 4 and a mating cylindrical cross section groove 6, the diameter of the shaft 2 minus the maximum groove 6 depth is slightly larger by the amount of desired bending deflection than the distance from the bottom of the cylindrical bearing surface to the bushings 5.

In the assembled state, the groove 6 length dimension is oriented substantially parallel to the longitudinal axis of the bushings 5, so as to facilitate engagement with the pin 4.

Preferably, the groove 6 is cut along a plane perpendicular to the longitudinal axis of the shaft 2 rather than oblique thereto, in order to provide a more effective axial locking of said shaft 2 with respect to the guide arm 1.

For a more effective locking against shaft 2 rotation relative to the guide arm 1, the groove 6 is cut chordwise rather than annular, although if limited rotation of the shaft 2 with respect to the guide arm 1 is desired, the groove 6 can be somewhat annular, i.e. curved along its length dimension.

To facilitate the driving of the pin 4 into the second bushing 5 from either fork 8, the forward end of said pin 4 is conically tapered as at 9, with the depth of such tapered portion 9 corresponding to the pin 4 bending deflection required to pass across the groove 6 and into the second bushing 5 after being driven through one bushing 5. In this way, straight rather than flared bushings 5 can be used, thus simplifying their machining and at the same time providing a somewhat greater bearing support area between the bushings 5 and pin 4.

As indicated by the drawing, the pin 4 can be expediently a longitudinally slotted tubular pin member 4 having a C-shaped transverse cross section.

While the foregoing description of a preferred embodiment of the invention necessarily requires certain obvious geometrical limits upon the guide arm 1, shaft 2, groove 6, pin 4 and bushing 5 elements, it will be apparent to the artisan that the concept of the invention is by no means limited by the geometry of such preferred embodiment.

Basically, the invention contemplates a support member such as represented by the guide arm 1 having a bearing surface 7 which engages a circumferential portion of the shaft 2, which need not even be circular in cross section. To hold the pin member 4 (which also need not be circular in cross section) in elastically preloaded bearing engagement with the surface of the groove 6, any suitable retaining means such as hooks (not shown) rather than the bushings 5 can be provided in the guide arm 1.

As can be appreciated from FIGS. 1 and 2, insofar as retention of the pin 4 is concerned, the portions of the bushing 5 surfaces toward the bearing surface 7 contribute relatively little to constraining the pin 4, and hence the bushings 5 could be constructed as elongated slots (not shown).

Thus, from the description of a preferred embodiment herein, it will be obvious to the artisan that the geometry of the individual elements comprising the fastening arrangement A of the invention can be varied as desired, provided that the shaft 2 is supported by a member such as the guide arm 1 and is locked against axial and rotary movement relative thereto by an elastically preloaded pin member 4 in contact with the surface of a groove 6 in such shaft 2.

The invention is not intended to be limited in any way by the specific embodiment described herein, but only by the following claims in which I have endeavored to claim all inherent novelty.

What is claimed is:

1. An arrangement for fastening a shaft to a support member, comprising in combination a support member having a bifurcated portion defining a bearing surface and a pair of fork arms extending from said bifurcated portion, said support member having a pair of coaxially aligned internal bushings extending one through each of said fork arms transversely with respect to said bearing surface, a shaft having a circumferential portion disposed in bearing engagement with said support member bearing surface, said shaft having a transverse groove oriented in substantially parallel relation to the central axis of said bushings, and a pin member extending through said bushings and disposed in bearing engagement with said groove, said bushings being disposed to hold the portions of the pin member passing therethrough below the effective depth of said shaft groove to effect a transverse bending of the pin member within the elastic limit thereof to hold said pin member in elastically preloaded bearing engagement with the shaft groove to secure said shaft to said support member and prevent rotary and axial relative movement therebetween.

2. The arrangement according to claim 1 wherein said shaft groove and pin member have substantially identical transverse cross sectional shapes.

3. The arrangement according to claim 1 wherein said pin member is a longitudinally slotted tubular pin member of C-shaped cross section.

4. The arrangement according to claim 1 wherein said partially cylindrical bearing surface extends for less than 180°.

References Cited

UNITED STATES PATENTS

| 609,433 | 8/1898 | Hearson. | |
| 1,969,500 | 8/1934 | Buckwalter | 287—52.02 X |
| 2,445,125 | 7/1948 | Reyburn et al. | 151—26 |
| 2,857,187 | 10/1958 | Comery et al. | 287—52.02 |
| 3,020,655 | 2/1962 | Launder | 85—8.3 X |
| 3,227,030 | 1/1966 | Preziosi et al. | 85—8.3 X |

FOREIGN PATENTS

| 105,155 | 1917 | Great Britain. |

EDWARD C. ALLEN, *Primary Examiner.*

CARL W. TOMLIN, *Examiner.*

W. L. SHEDD, *Assistant Examiner.*